(12) United States Patent
Loesing (10) Patent No.: US 10,087,900 B2
(45) Date of Patent: Oct. 2, 2018

(54) FUEL FILTER

(71) Applicant: Willibrord Loesing Filterproduktion GmbH, Hattigen (DE)

(72) Inventor: Ingeborg Loesing, Hattingen (DE)

(73) Assignee: WILLIBRORD LOESING FILTERPRODUKTION GMBH, Hattingen (DE)

( * ) Notice: Subject to any disclaimer, the term of this patent is extended or adjusted under 35 U.S.C. 154(b) by 45 days.

(21) Appl. No.: 15/384,542

(22) Filed: Dec. 20, 2016

(65) Prior Publication Data
US 2017/0234281 A1  Aug. 17, 2017

(30) Foreign Application Priority Data

Feb. 16, 2016  (EP) .................................... 16155967

(51) Int. Cl.
| | | |
|---|---|---|
| *F02M 37/00* | (2006.01) | |
| *F02M 37/22* | (2006.01) | |
| *B01D 35/00* | (2006.01) | |
| *B01D 35/18* | (2006.01) | |
| *B01D 36/00* | (2006.01) | |

(52) U.S. Cl.
CPC ......... *F02M 37/223* (2013.01); *B01D 35/005* (2013.01); *B01D 35/18* (2013.01); *B01D 36/001* (2013.01); *B01D 36/003* (2013.01); *F02M 37/0052* (2013.01); *F02M 37/221* (2013.01); *B01D 2201/295* (2013.01)

(58) Field of Classification Search
CPC .... F02M 37/22; F02M 37/223; F02M 37/225; F02M 37/221; F02M 37/0052; B01D 36/001; B01D 36/003; B01D 35/18; B01D 35/005; B01D 2201/295
USPC .................................................. 123/510, 514
See application file for complete search history.

(56) References Cited

U.S. PATENT DOCUMENTS

| | | | | |
|---|---|---|---|---|
| 4,298,465 A | * | 11/1981 | Druffel ............. | B01D 17/0211 210/304 |
| 4,456,529 A | * | 6/1984 | Shinaver ................ | B01D 29/21 210/306 |
| 4,502,954 A | * | 3/1985 | Druffel .................. | B01D 17/00 210/136 |
| 4,574,762 A | * | 3/1986 | Muller ................... | F02M 31/16 123/510 |
| 5,078,875 A | * | 1/1992 | Losing ............... | B01D 17/0208 210/295 |
| 7,192,518 B2 | * | 3/2007 | Roesgen .............. | B01D 29/608 210/149 |

(Continued)

*Primary Examiner* — Thomas Moulis
(74) *Attorney, Agent, or Firm* — Andrew Wilford (57) ABSTRACT

A fuel filter used with a supply of liquid fuel and with an engine has a housing formed with a filter chamber, with inlet and outlet ports respective connected to the supply and to the engine and opening into the chamber, and with a through-going return passage juxtaposed with the filter chamber and extending between a return-fuel inlet connected to the engine and a return-fuel outlet connected to the tank. A filter element is in the chamber between the inlet and outlet ports. Fuel moves in a circuit from the supply to the inlet port, then through the filter element in the chamber, then out the outlet port to the engine where a portion of the fuel is consumed and a portion of it is heated and flowed back to the return-fuel inlet, and then through the passage and out the return-fuel outlet to the supply.

16 Claims, 3 Drawing Sheets

(56) References Cited

U.S. PATENT DOCUMENTS

| | | | |
|---|---|---|---|
| 8,858,795 B2* | 10/2014 | McLane | B01D 29/07 210/304 |
| 2006/0180527 A1 | 8/2006 | Blaschke | |
| 2009/0230048 A1* | 9/2009 | Braunheim | B01D 35/153 210/236 |
| 2010/0258091 A1* | 10/2010 | Cushing | F02M 27/08 123/495 |
| 2013/0248464 A1* | 9/2013 | Schweitzer | B01D 36/003 210/791 |

* cited by examiner

Fig.4

FUEL FILTER

FIELD OF THE INVENTION

The present invention relates to a fuel filter. More particularly this invention concerns such a filter used for diesel fuel burnt in an engine of a motor vehicle.

BACKGROUND OF THE INVENTION

A typical apparatus for cleaning a fluid medium, particularly for cleaning fuel and in which solid particulates and fluid components of greater density are separated from fluid components of lesser density, has a housing having at least one inlet port for the fluid medium to be cleaned and at least one outlet port for the cleaned fluid medium. Such an apparatus is used for cleaning fuels, preferably diesel fuels. The fluid components of greater density to be separated from the fluid medium, more particularly from the fuel/diesel fuel, are especially water to be separated out. The fuel, more particularly diesel fuel, cleaned in the apparatus is subsequently fed to a consumer, particularly an engine, more particularly an automobile engine.

Various versions of an apparatus of the type described above are known from practice. Such an apparatus is described, for example, in U.S. Pat. No. 5,078,875 and US 2006/0180527. These apparatuses have categorically proven their worth. However, many of the apparatuses of the type mentioned above and known from practice have certain drawbacks. Up to 12% air can dissolve in diesel fuel at room temperature. In the event of a drop in pressure, at least a portion of this gas, more particularly air, outgases. In most of the apparatuses known from practice, the air cannot pass through a filter subassembly provided in the apparatus and accumulates upstream of the filter subassembly. Only once the resulting pressure is sufficiently high can larger quantities of air temporarily pass through the filter subassembly. That is disadvantageous inter alia with regard to the proper functioning of the filter subassembly. Another drawback of the apparatuses known from practice is that, at temperatures below −5° C., components of the diesel fuel flocculate and can clog the filter subassembly. The flocculated components generally melt again only starting at a temperature of 20° C. As a result, the known apparatuses have room for improvement.

OBJECTS OF THE INVENTION

It is therefore an object of the present invention to provide an improved fuel filter.

Another object is the provision of such an improved fuel filter that overcomes the above-given disadvantages, in particular that avoids the above-mentioned drawbacks in a simple and effective manner.

SUMMARY OF THE INVENTION

These objects are attained by a fuel filter used in combination with a supply of liquid fuel and with an engine. The fuel filter itself comprises a housing formed with
  a filter chamber,
  an inlet port connected to the supply and opening into the chamber,
  an outlet port connected to the engine and opening into the chamber, and
  a throughgoing return passage juxtaposed with the filter chamber and extending between a return-fuel inlet connected to the engine and a return-fuel outlet connected to the tank.

A filter element is provided in the chamber between the inlet and outlet ports and subdivides the chamber into an upstream inflow compartment into which the inlet port opens and a downstream outflow compartment into which the outlet port opens. Pump means associated with the engine moves the fuel in a circuit from the supply to the inlet port, thence through the filter element in the chamber, thence out the outlet port to the engine where a portion of the fuel is consumed and a portion of it is heated and flowed back to the return-fuel inlet, and thence through the passage and out the return-fuel outlet to the supply. Thus the heated fuel in the return passage heats the housing and the fuel therein.

With the apparatus according to the invention, particularly fuel, more particularly diesel fuel, is cleaned before it is fed to a consumer, particularly an engine. Fuel that is not used by the consumer or engine is returned, generally to a tank, more particularly a fuel tank. According to the invention for this fuel, before being returned to the tank, is fed through the return passage of the apparatus according to the invention. The fuel is introduced into the housing through the return-fuel inlet of the return passage and fed out of the housing again through the return-fuel outlet. In the normal operating position of the apparatus, the return-fuel inlet and return-fuel outlet of the return passage are preferably at the same level or at substantially the same level. It is recommended that the return-fuel inlet and the return-fuel outlet be on opposite sides of the housing and be on the same level.

It lies within the scope of the invention for the return passage within the housing to have at least one opening directed toward the housing lower wall and through which rising gas, particularly rising air, enters the return passage so that this gas, more particularly this air, can be discharged out of the housing with the fluid medium flowing through the return passage. The housing lower wall refers here to the erect vertical or substantially vertical normal operating position of the apparatus in which the housing lower wall is on the bottom and the return passage on the top. According to a preferred embodiment of the invention, the return passage is horizontal or substantially horizontal in this normal operating position of the apparatus. It is recommended that the return-fuel inlet and return-fuel outlet of the return passage have the same opening width and/or the same opening diameter.

According to a very preferred embodiment of the invention, the return passage is open toward the housing lower wall over the majority of its length passing through the housing. The return passage then advantageously has a long, preferably continuous, opening directed toward the housing lower wall. It is recommended for the return passage to be open over at least 30%, preferably over at least 40% and very preferably over at least 45% of its circumference toward the housing lower wall. According to one design variant of the invention, the return passage has a round or circular cross section and, in particular, the return-fuel inlet and return-fuel outlet of the return passage have a round or circular cross section.

One recommended embodiment of the invention is characterized in that, in order to convey the gas flow to the return passage and to convey the accumulation of gas in the return passage, at least one flow passage that is angled toward the opening of the return passage and preferably at least two, preferably only two flow passages that are angled toward the opening of the return passage are provided. It has proven advantageous if such a flow passage is embodied as a flow groove that is open toward the housing lower wall. Advantageously, a flow passage or a flow groove is embodied so as to be angled toward the housing lower wall. It is recommended that a flow passage or a flow groove be provided or made in the lower wall of the housing cover.

It lies within the scope of the invention for gas, particularly air, to flow through the flow passages or flow grooves upward into the return passage. Relative to a flow passage or to a flow groove, the return passage or the upper wall of the return passage advantageously forms the highest point or the highest level, as it were, to which gas or air flows through the flow passage/through the flow groove. It is expedient if such a flow passage or such a flow groove is embodied so as to be continuous toward the opening of the return passage or housing upper side. The angle of inclination is preferably 5° to 45°, more preferably 8° to 30°. The angle of inclination is advantageously measured in the normal operating position of the apparatus between the flow passage or the flow groove and a horizontal plane. According to a recommended embodiment, two flow passages or two flow grooves flow in a mirror-symmetrical manner relative to a symmetry plane perpendicular to the longitudinal axis of the return passage. It is recommended that the flow passages or flow grooves and particularly the two flow passages or flow grooves meet in the longitudinal center of the return passage or about in the center of the return passage.

One especially preferred embodiment of the invention is characterized in that the return passage with the return-fuel inlet and return-fuel outlet is juxtaposed on the same side of flow of a filter subassembly to be flowed through by the fluid medium as the inlet port or the outlet port for the fluid medium. Preferably, the return passage is provided with the return-fuel inlet and return-fuel outlet on the same side of flow as the inlet port. It has proven advantageous if, in the normal operating position of the apparatus, the return passage, preferably with both the return-fuel inlet and the return-fuel outlet, is above the inlet port or the outlet port, preferably above the inlet port.

It lies within the scope of the invention if heated fluid medium can be introduced into the return passage via the return-fuel inlet of the return passage, thereby warming or heating the interior of the housing, more particularly the fluid medium present inside the housing. Furthermore, it lies within the scope of the invention if the fuel, more particularly diesel fuel, returned from a consumer, particularly from an engine, is introduced into the apparatus according to the invention in order to perform heating here before the fuel/diesel fuel is preferably returned to a tank, more particularly a fuel tank. As a rule, only about 10% of the cleaned fuel delivered is actually used by the consumer, more particularly by the engine. The remaining fuel is normally returned to the tank/fuel tank. According to the invention, the unused fuel is introduced into the apparatus according to the invention for heating this apparatus before it is returned from the return-fuel outlet of the return passage to the tank/fuel tank. Moreover, it lies within the scope of the invention if the fuel heated by a consumer, more particularly by an engine, is introduced without cooling or without substantial cooling into the apparatus, more particularly into the return-fuel inlet of the return passage.

The invention is based on the insight that two vital functions can be performed with the fluid medium returned from the consumer to the return passage of the apparatus according to the invention. For one, this returned medium can be used to remove from the apparatus gas, particularly air, that has accumulated in the return passage and, for another, the returned heated fluid medium can also be used to heat the apparatus, more particularly the fluid medium already present in the apparatus. In this way, it is particularly possible to prevent components from flocculating in the diesel fuel at low temperatures and clogging the filter subassembly of the apparatus according to the invention.

The fuel to be cleaned is cleaned before being fed to the consumer, more particularly to the engine, in the apparatus according to the invention. According to an especially preferred embodiment of the invention, this fuel to be cleaned is heated upstream of the inlet port of the housing by at least one heater, thereby introducing heated fluid medium to be cleaned into the apparatus. Such heating preferably occurs when the consumer is started, more particularly at engine start, so that precipitation or flocculation of fuel components can be prevented or components that have already precipitated or flocculated can be reliquefied. It lies within the scope of the invention that the heater need not be operated continuously. On starting the consumer, more particularly starting the engine, with the heating by the above-described heater, it is generally sufficient to heat or preheat the apparatus according to the invention by the fuel, more particularly diesel fuel, returned into the return passage. At startup of the consumer or engine, the fluid medium to be cleaned is thus heated by the heater, and after startup of the consumer or engine, the fluid medium present in the apparatus is heated by the fuel returned to the return passage.

It lies within the scope of the invention if the housing of the apparatus according to the invention has a housing base and a housing cover fixed on the housing base. Preferably, the housing cover is detachable from the housing base. According to one design variant of the invention, the housing cover can be fixed by a screw connection to the housing base and also detached again by this screw connection. According to an especially recommended embodiment of the invention, the return passage, preferably with its return-fuel inlet and return-fuel outlet, is in the housing cover. Advantageously, the inlet port for the liquid medium to be cleaned and/or the outlet port for the cleaned liquid medium is provided in the container cover.

It lies within the scope of the invention if a filter subassembly is provided in the housing of the apparatus according to the invention, with the filter subassembly having at least one filter element for separating solid particles from the fluid medium as well as at least one separating screen for separating out fluid components of greater density, particularly for separating out water. One especially preferred embodiment of the invention is characterized in that at least one sump for catching or collecting the fluid components of greater density, particularly water, is provided. The sump is advantageously on the housing lower wall. It lies within the scope of the invention if fluid components of greater density, particularly water, run or flow on the separating screen under the effect of gravity toward the housing lower wall and particularly into the sump.

One recommended embodiment of the invention is characterized in that the filter element is a tubular cylinder around a central passage of the housing, particularly around a central passage of the housing that is vertical or substantially vertical in the normal operating position of the apparatus. The central passage is advantageously in the center of the housing of the apparatus according to the invention. It has proven advantageous if the filter material of the filter element is pleated and if the pleats of the filter material preferably extend longitudinally or parallel to the longitudinal axis of the housing. It therefore lies within the scope of the invention if the pleats of the pleated filter material extend longitudinally of the housing. This pleated construction of the filter material makes it possible for gas, more particularly air, to flow upward toward the return passage. It has proven advantageous if the filter material of the filter element has coalescence characteristics so that fluid components of greater density can coalesce or form droplets that can easily be discharged by the separating screen and collected in the sump. One very recommended embodiment of the invention is characterized in that the separating screen for the fluid components of greater density surrounds the central passage of the housing and that the separating screen, in turn, is surrounded by the filter element or by the filter material of the filter element.

One embodiment of the invention that has proven to be very advantageous is characterized in that the filter subassembly is flowed through radially by fluid medium to be cleaned, preferably radially from the outside to the inside, such that the cleaned liquid medium flows or is conducted out of the housing through the central passage via the outlet port. It lies within the scope of the invention if fluid components of greater density flow downward toward the housing lower wall and/or into the sump. One very preferred embodiment of the invention is characterized in that the return passage with its return-fuel inlet and return-fuel outlet and the inlet port for the fluid medium to be cleaned are on the upstream side or inflow side of the filter subassembly, and that the central passage is preferably provided on the outflow side of the filter subassembly, so that the cleaned fluid medium flows via the central passage toward the outlet port.

It is recommended that the return passage be at an edge of the housing or at the edge of the housing cover. The return passage is preferably bordered on one side by the side wall of the housing or by the side wall of the housing cover. It therefore lies within the scope of the invention if the return passage runs tangentially to the cross section, preferably to the round cross section, of the housing or of the housing cover. It is expedient and preferred in the embodiment described above if the inlet port and/or the outlet port is on the same side of the housing or housing cover as the return passage.

The invention is based on the discovery that, with an apparatus according to the invention, the drawbacks cited at the outset that are known from practice and from the prior art can be avoided and/or substantially reduced in a simple and functionally reliable manner. Moreover, the invention is based on the discovery that the fluid medium returned from a consumer, more particularly from an engine, can be used without any difficulty for the purpose of avoiding these drawbacks. It should be emphasized in this regard that returned fluid medium, more particularly returned fuel, is used in any event and that no additional elaborate measures are required in this respect. Given the fact that the returned fluid medium is conducted through the return passage according to the invention, the accumulation of gas, more particularly air, in the housing of the apparatus according to the invention can be prevented, for one. For another, the fuel returned into the return passage can be used to heat the housing, more particularly the fluid medium present in the housing, thus preventing objectionable precipitation or flocculation from occurring in the medium at low temperatures. These remarkable advantages are achieved simply and at little expense. All that is required in principle is the provision of the return passage according to the invention; otherwise, the fluid medium that is present in any event is used to achieve the afore-described advantages. The apparatus according to the invention is therefore also characterized by low cost.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
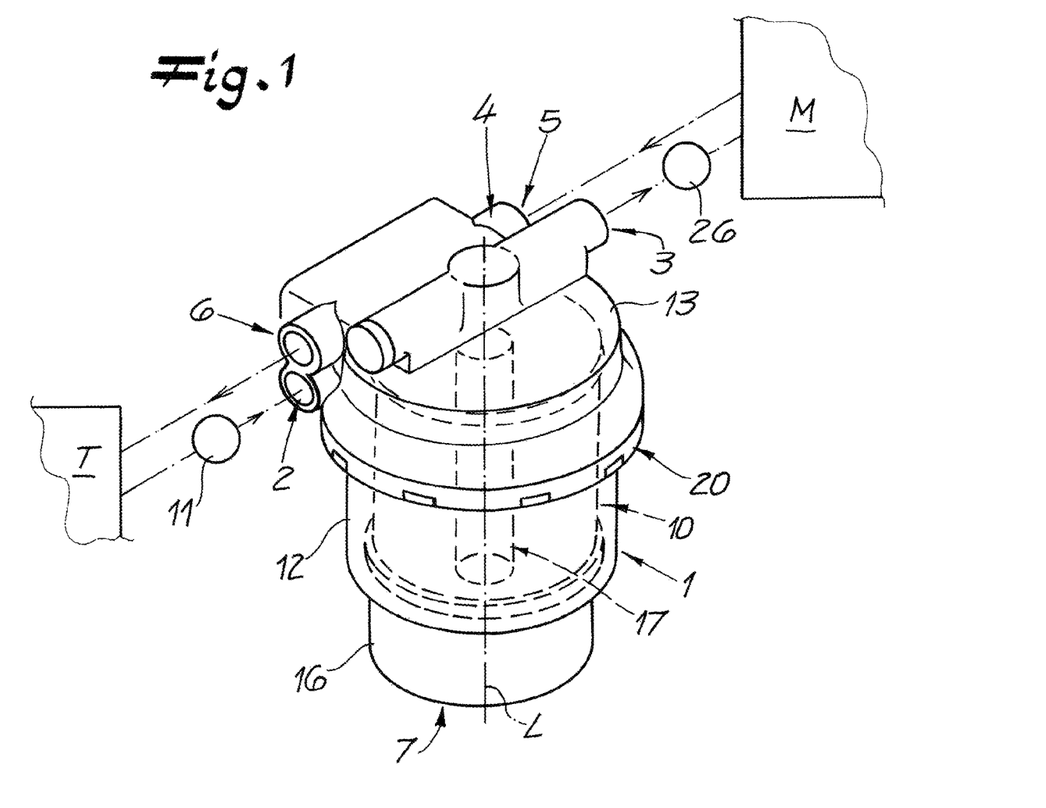
FIG. 1 is a perspective view of an apparatus according to the invention.

FIG. 1 shows an apparatus according to the invention for cleaning a fluid medium, here diesel fuel. With this apparatus, solid particles and fluid components of greater density can be separated from fluid components of lesser density.

The apparatus has a housing 1 with an inlet port 2 for the fluid medium to be cleaned (diesel fuel) and an outlet port 3 for the cleaned fluid medium (cleaned diesel fuel). According to the invention, a return passage 4 for the fluid medium returned from a consumer, here an engine M, is provided with a return-fuel inlet 5 and a return-fuel outlet 6, with the return passage 4 passing through the housing 1.

FIG. 1 shows a highly simplified view of the preferred functionality of an apparatus according to the invention. Diesel fuel to be cleaned is drawn by a pump 26 from a tank T to the apparatus according to the invention and there enters the housing 1 through the inlet port 2. After cleaning in the apparatus, the diesel fuel moves again out of the outlet port 3 and to the engine M. Diesel fuel not used by the engine M is then returned to the tank T according to the invention via the return passage 4 of the apparatus according to the invention. The returned diesel fuel coming from the engine is introduced through the return-fuel inlet 5 into the housing 1, flows through the return passage 4, and passes out of the housing 1 again through the return-fuel outlet 6 to the tank T.

Figure 2:
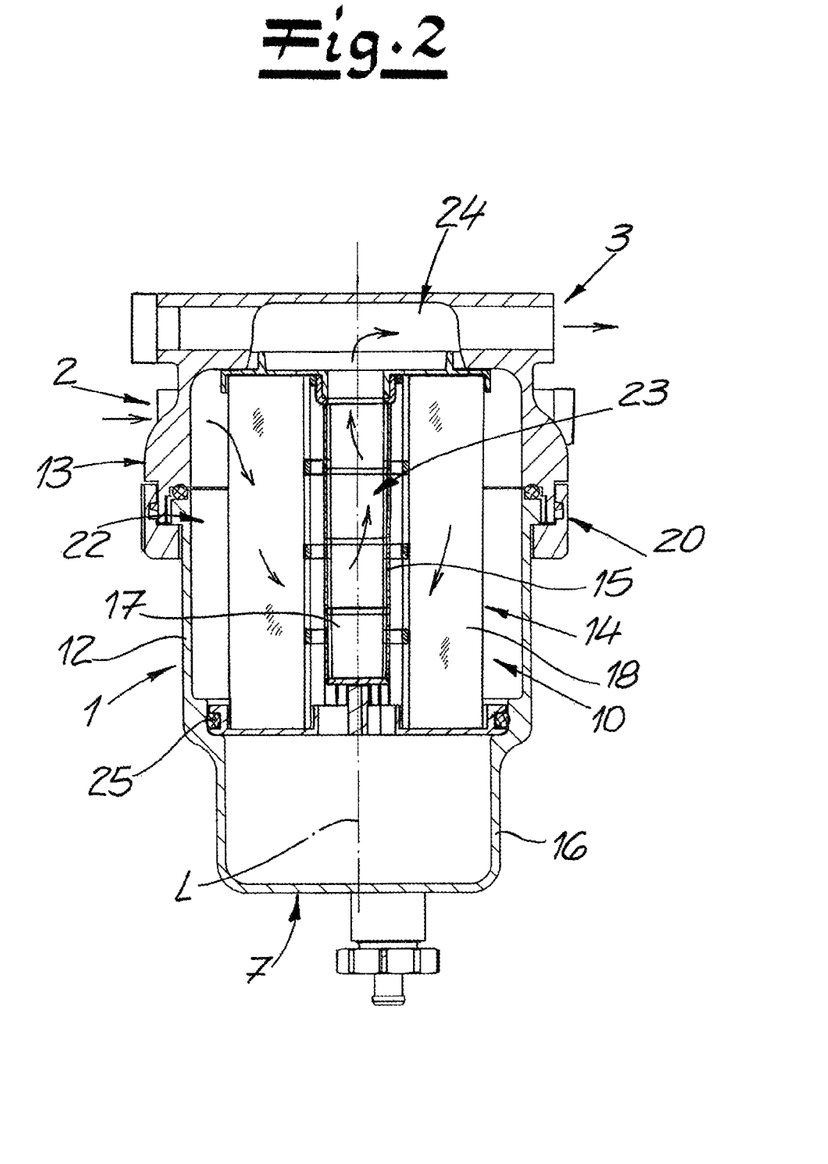
FIG. 2 is a section through the apparatus of FIG. 1.

Here the housing 1 preferably has a lower housing base 12 with a lower wall 7 as well as a cover 13 fixed on the housing base 12. Preferably and here the housing base 12 and housing cover 13 are detachably interconnected, with a screw connection 20 being recommended used for this purpose, as in the illustrated embodiment.

Figure 3:
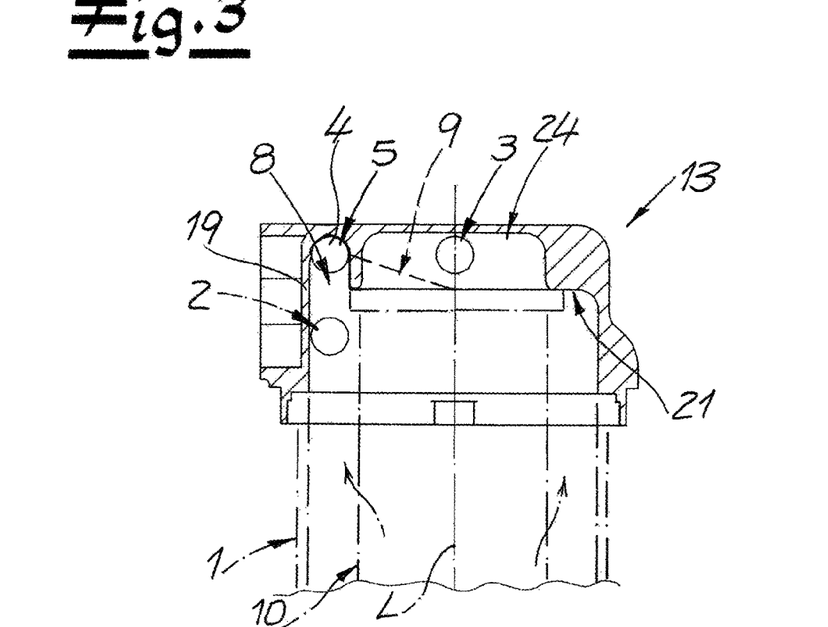
FIG. 3 is a section through the housing cover of the apparatus according to the invention.

It lies within the scope of the invention if the return passage 4 has an opening 8 directed toward the housing lower wall 7 of the housing 1. Preferably and here the return passage 4 is open toward the housing lower wall 7 over the majority of its length 1 passing through the cover 13 of the housing 1. The result is that the opening 8 is long and continuous. the opening 8 is open toward the housing lower wall 7 over more than 40% of the circumference of the return passage 4. and the return passage 4 has a round or circular cross section. The downwardly directed opening 8 of the return passage 4 ensures that gas, particularly air, emerging from the fluid medium, more particularly from the diesel fuel, rises in the housing 1 and collects in the opening 8 and/or in the return passage 4. The fluid medium (diesel fuel) returned via the return passage 4 can carry this gas, more particularly this air, along and discharge it from the housing 1 via the return-fuel outlet 6. Objectionable accumulations of gas, more particularly of air, in the housing 1 can thus be prevented in an advantageous manner. Once in the tank, the entrained air can be vented or fed to the engine intake manifold.

Figure 4:
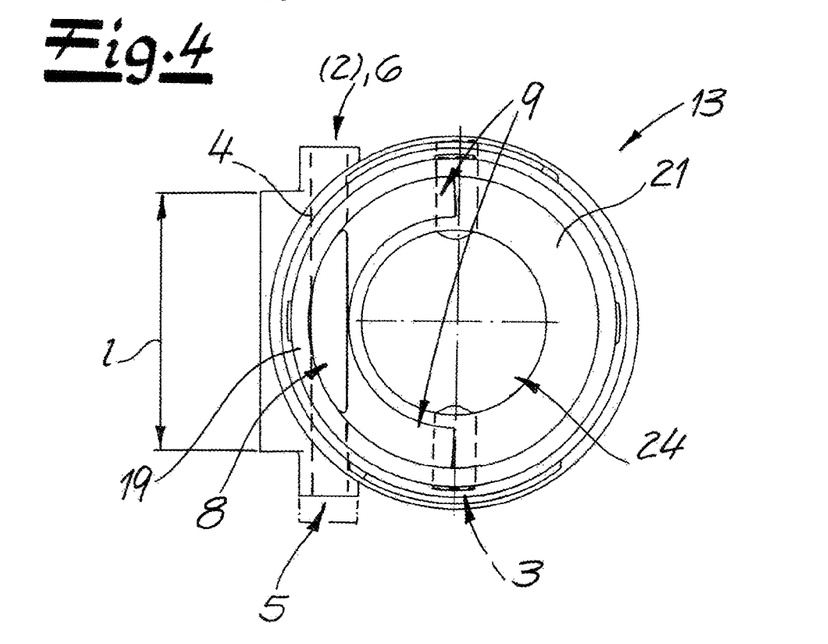
FIG. 4 is a bottom view of the housing cover of the apparatus according to the invention.

According to a preferred embodiment and here two flow grooves 9 angled upward and inward toward the opening 8 of the return passage 4 are provided to conduct the gas flow toward the return passage 4 and to conduct the accumulation of gas into the return passage 4 (FIG. 4). Preferably and here these flow grooves 9 are provided on or in the lower face of the cover 21 of the container cover 13. These flow grooves 9 are angled continuously toward the return passage 4 and preferably and here toward the center of the return passage 4. The upper wall of the return passage 4, which, both is on the bottom face 21 of the cover of the container cover 13, forms the highest point and/or the highest level relative to the flow grooves 9 to which the gas, more particularly the air, flows upward through the flow grooves 9.

Figure 1A:
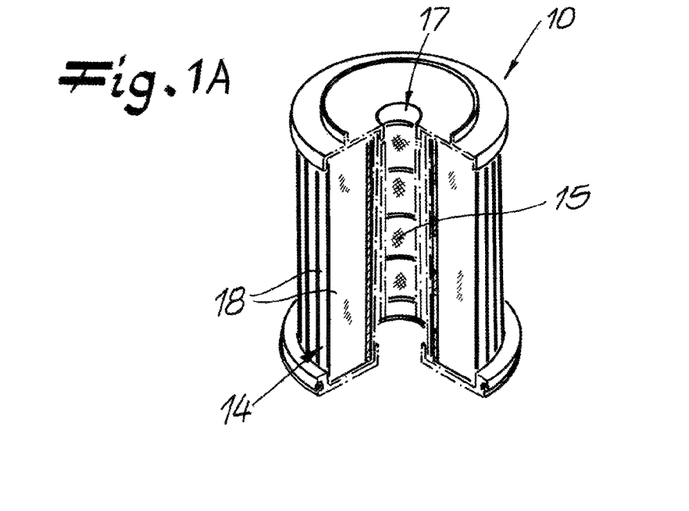
FIG. 1A is a perspective view of the filter element of this invention.

A filter subassembly 10 is provided in the housing 1 of the apparatus according to the invention. It has an overall tubularly cylindrical filter element 14 and a likewise tubularly cylindrical separating screen 15 mounted in it. Preferably and here the filter element 14 and the separating screen 15 surround and define a central passage 17 of the housing 1 and the filter element 14 and separating screen 15 are coaxial to the central passage 17 that itself runs parallel and coaxially to a longitudinal central axis L of the generally cylindrical housing 1.

The filter subassembly 10 in the housing 1 divides the chamber of the housing into an upstream inflow side 22 for the fluid medium to be cleaned (diesel fuel) and a downstream outflow side 23 for the cleaned fluid medium (diesel fuel). The fluid medium to be cleaned (diesel fuel) flows via the inlet port 2, which is in the housing cover 13, into the inflow side 22 that extends annularly around the filter subassembly 10. The fluid medium to be cleaned then flows radially inward through the filter element 14, with solid particles being separated from the fluid medium, and subsequently flows radially inward through the separating screen 14, with fluid components of greater density being separated from fluid components of lesser density. The components of greater density are particularly water. The components of greater density, more particularly the water, flows under the effect of gravity toward the housing lower wall 7 and collects in a sump 16 at the bottom of the housing. The central passage 17 oriented coaxially to the central longitudinal axis L of the housing 1 forms the outflow side 23 for the fluid medium cleaned in the filter subassembly 10. This cleaned fluid medium (diesel fuel) flows upward via the central passage 17 into a cylindrical outlet area 24 and exits it via the outlet port 3 of the housing.

The figures show that the return passage 4 according to the invention is oriented with its return-fuel inlet 5 and its return-fuel outlet 6 on the same side of flow, namely on the inflow side 22, as the inlet port 2 of the housing. The return passage 4 is provided with its return-fuel inlet 5 and its return-fuel outlet 6 outside the inlet port 2. Here the outlet port 3 is provided at the same level as the return passage 4, more particularly its return-fuel inlet 5, and its return-fuel outlet 6.

It was already pointed out above that, according to a preferred embodiment of the invention, diesel fuel not used up by the engine is introduced into the apparatus according to the invention via the return-fuel inlet 5 of the return passage 4. This is heated diesel fuel, so the interior of the housing, more particularly the diesel fuel inside the housing is warmed or heated. Unwanted precipitation or flocculation such as occurs particularly at lower temperatures can thus be prevented in a simple and effective manner from occurring in the housing 1. Thus the return passage 4 according to the invention performs two essential functions. For one, the fluid medium returned to the return passage 4 can be used to functionally and reliably remove from the housing 1 gas, more particularly air, that forms or accumulates in the housing. For another, the housing 1 can be heated by the fluid medium returned to the return passage 4 in order to prevent unwanted flocculation from occurring.

Furthermore, a preferred embodiment of the invention is characterized in that a heater 11 is provided upstream of the inlet port 2 to heat the fluid medium to be cleaned that is introduced into the housing 1. Preferably, this heater 11 operates above all or only when the engine M is started. During subsequent running, further heating of the fluid medium can occur by means of the hot fluid medium returned to the return passage 4.

The filter subassembly 10 has a filter element 14 for separating solid particles from the fluid medium. The filter material of the filter element 14 is pleated, and the pleats 18 of the filter material extend parallel to the longitudinal central axis L of the housing 1. By virtue of this orientation of the filter material, gas, particularly air, present in the housing 1 can easily flow upward through the paces between the pleats 18 of the filter material toward the return passage 4. Moreover, the filter material of the filter element 14 has coalescence characteristics and thus promotes the formation of droplets of the fluid components of greater density, particularly of water, to facilitate separation of these fluid components on the separating screen 15 and hence the collection of these components in the sump 16.

The filter subassembly 10 is also sealed off from the lower region of the housing 1, more particularly from the sump 16, by a seal 25 that is preferably embodied as an O-ring. The figures show that, the return passage 4 according to the invention is at the edge of the housing 1, more particularly of the housing cover 13, and, preferably and here is bordered on one side by a side wall 19 of the housing 1 or of the housing cover 13. Advantageously, and here the inlet port 2 is also provided at this edge of the housing 1, it being preferred and provided for here as already noted, that the inlet port 2 is below the return passage 4.

I claim:
1. In combination with a supply of liquid fuel and with an engine,
   a fuel-filter housing formed with
      a filter chamber,
      an inlet port connected to the supply and opening into the chamber,
      an port connected to the engine and opening into the chamber, and
      a throughgoing return passage juxtaposed with the filter chamber and extending between a return-fuel inlet connected to the engine and a return-fuel outlet connected to the tank, the return passage having at least one opening directed toward a housing lower wall and through which rising gas enters the return passage, so that the gas can be discharged from the housing with the fuel flowing through the return passage, and
   a filter element in the chamber between the inlet and outlet ports; and pump means associated with the engine for moving the fuel from the supply to the inlet port, thence through the filter element in the chamber, thence out the outlet port to the engine where a portion of the fuel is consumed and a portion of it is heated and flowed back to the return-fuel inlet and thence through the passage and out the return-fuel outlet to the supply, whereby the heated fuel in the return passage heats the housing and the fuel therein.

2. The combination defined in claim 1, wherein the return passage is open toward the housing lower wall over the majority of its length passing through the housing.

3. The combination defined in claim 1, wherein the housing is formed in the chamber with at least one flow groove angled to the opening of the return passage and open downward toward the housing lower wall.

4. The combination defined in claim 3, wherein the return passage with the return-fuel inlet and return-fuel outlet are juxtaposed with the inlet port, and, in a normal operating position of the apparatus, the return passage is above the inlet port.

5. In combination with a supply of liquid fuel and with an engine,
a fuel-filter housing formed with
 a filter chamber,
 an inlet port connected to the supply and opening into the chamber,
 an outlet port connected to the engine and opening into the chamber, and
 a throughgoing return passage juxtaposed with the filter chamber and extending between a return-fuel inlet connected to the engine and a return-fuel outlet connected to the tank, and
a filter element in the chamber between the inlet and outlet ports;
pump means associated with the engine for moving the fuel from the supply to the inlet port, thence through the filter element in the chamber, thence out the outlet port to the engine where a portion of the fuel is consumed and a portion of it is heated and flowed back to the return-fuel inlet and thence through the passage and out the return-fuel outlet to the supply, whereby the heated fuel in the return passage heats the housing and the fuel therein; and
a heater for heating the fuel introduced into the housing upstream of the inlet port of the housing.

6. The combination defined in claim 5, further comprising:
control means for operating the heater only during a starting phase of the engine when same is cold.

7. In combination with a supply of liquid fuel and with an engine,
a fuel-filter housing having a housing base and a housing cover detachably fixed on the housing base and forming with the cover
 a filter chamber,
 an inlet port connected to the supply and opening into the chamber,
 an outlet port connected to the engine and opening into the chamber, and
 a throughgoing return passage juxtaposed with the filter chamber and extending between a return-fuel inlet connected to the engine and a return-fuel outlet connected to the tank, the return passage being in the cover with the return-fuel inlet and the return-fuel outlet, and
a filter element in the chamber between the inlet and outlet ports; and
pump means associated with the engine for moving the fuel from the supply to the inlet port, thence through the filter element in the chamber, thence out the outlet port to the engine where a portion of the fuel is consumed and a portion of it is heated and flowed back to the return-fuel inlet and thence through the passage and out the return-fuel outlet to the supply, whereby the heated fuel in the return passage heats the housing and the fuel therein.

8. In combination with a supply of liquid fuel and with an engine,
a fuel-filter housing formed with
 a filter chamber,
 an inlet port connected to the supply and opening into the chamber,
 an outlet port connected to the engine and opening into the chamber, and
 a throughgoing return passage juxtaposed with the filter chamber and extending between a return-fuel inlet connected to the engine and a return-fuel outlet connected to the tank, and
a filter element in the chamber between the inlet and outlet ports and having a separating screen for separating fluid components of greater density and the housing forms below the filter element at least one sump for catching or collecting the fluid components of greater density; and
pump means associated with the engine for moving the fuel from the supply to the inlet port, thence through the filter element in the chamber, thence out the outlet port to the engine where a portion of the fuel is consumed and a portion of it is heated and flowed back to the return-fuel inlet and thence through the passage and out the return-fuel outlet to the supply, whereby the heated fuel in the return passage heats the housing and the fuel therein.

9. The combination defined in claim 8, wherein the filter element is tubularly cylindrical and defines a central passage of the housing that is substantially vertical in a normal operating position of the apparatus and that is formed of filter material that is formed with pleats extending vertically and parallel to a vertical longitudinal central axis of the housing.

10. The combination defined in claim 8, the separating screen surrounds the central passage of the housing and is surrounded by the filter element that is a tubular cylinder.

11. The combination defined in claim 8, wherein the pump means moves the fuel radially inwardly from the inlet port through the filter element to the central passage and thence up the central passage to the outlet port.

12. The combination defined in claim 11, wherein the return passage with the return-fuel inlet and the return-fuel outlet as well as the inlet port are upstream of the filter element and the central passage is downstream of the filter element.

13. The combination defined in claim 9, wherein the return passage is at an edge of the housing cover and is bordered on one side by a side wall of the housing cover.

14. In combination with a supply of liquid fuel and with an engine,
a fuel-filter housing formed with
 a filter chamber,
 an inlet port connected to the supply and opening into the chamber, an outlet port connected to the engine and opening into the chamber, and a throughgoing return passage juxtaposed with the filter chamber and extending between a return-fuel inlet connected to the engine and a return-fuel outlet connected to the tank, the inlet port or the outlet port being on the same side of the housing or housing cover as the return passage, and a filter element in the chamber between the inlet and outlet ports; and pump means associated with the engine for moving the fuel from the supply to the inlet port, thence through the filter element in the chamber, thence out the outlet port to the engine where a portion of the fuel is consumed and a portion of it is heated and flowed back to the return-fuel inlet and thence through the passage and out the return-fuel outlet to the supply, whereby the heated fuel in the return passage heats the housing and the fuel therein.

15. The combination defined in claim 1, wherein the opening of the return passage opens into the chamber between the inlet port and the fuel element.

16. In combination with a supply of liquid fuel and with an engine, a fuel-filter housing formed with a filter chamber, an inlet port connected to the supply and opening into the chamber, an outlet port connected to the engine and opening into the chamber, a throughgoing return passage juxtaposed with the filter chamber and extending between a return-fuel inlet connected to the engine and a return-fuel outlet connected to the tank, the return passage having at least one opening directed toward a housing lower wall and through which rising gas enters the return passage, so that the gas can be discharged from the housing with the fuel flowing through the return passage, and a sump below the chamber;

a filter element in the chamber between the inlet and outlet ports and subdividing the chamber into an upstream inflow compartment into which the inlet port opens and a downstream outflow compartment into which the outlet port opens, the filter element being adapted to separate solid particles, gas, and dense liquid from the fuel, the return passage having an opening into the inflow compartment; and pump means associated with the engine for moving a stream of the fuel from the supply to the inlet port, thence through the filter element in the chamber, thence out the outlet port to the engine where a portion of the stream of fuel is consumed and a portion of it is heated and flowed back to the return-fuel inlet and thence through the passage and out the return-fuel outlet to the supply, whereby the heated fuel in the return passage heats the housing and the fuel therein while dense liquid in the fuel settles into the sump and gas in the fuel rises up to the return passage and is carried off by the fuel therein.

\* \* \* \* \*